(12) United States Patent
Suzuki

(10) Patent No.: US 6,775,079 B2
(45) Date of Patent: Aug. 10, 2004

(54) SIGNAL TRANSMISSION APPARATUS AND SIGNAL RECORDING APPARATUS IN WHICH A ROTARY TRANSFORMER IS USED

(75) Inventor: Kyoko Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/209,499

(22) Filed: Jul. 31, 2002

(65) Prior Publication Data

US 2003/0039046 A1 Feb. 27, 2003

(30) Foreign Application Priority Data

Aug. 3, 2001 (JP) .................................... P2001-236237

(51) Int. Cl.[7] .............................................. G11B 5/09
(52) U.S. Cl. ........................................................ 360/46
(58) Field of Search ................................ 360/108, 124, 360/65, 46, 68, 53

(56) References Cited

U.S. PATENT DOCUMENTS

| | | | | |
|---|---|---|---|---|
| 4,742,414 A | * | 5/1988 | Sakai et al. ............ | 360/130.24 |
| 4,853,800 A | * | 8/1989 | Schulz ...................... | 360/46 |
| 5,455,729 A | * | 10/1995 | Nelson et al. ........... | 360/281.4 |
| 6,198,585 B1 | * | 3/2001 | Higurashi et al. ....... | 360/48 |
| 6,304,397 B1 | * | 10/2001 | Ozue et al. .............. | 360/29 |

FOREIGN PATENT DOCUMENTS

| | | | | |
|---|---|---|---|---|
| JP | 404341901 A | * | 11/1992 | ................. 360/75 |
| JP | 02000322702 A | * | 11/2000 | ................. 360/18 |

* cited by examiner

*Primary Examiner*—David Hudspeth
(74) *Attorney, Agent, or Firm*—Sonnenschein, Nath & Rosenthal LLP

(57) ABSTRACT

The invention provides a signal transmission apparatus and a signal recording apparatus by which, while a rotary transformer is used, a wide bandwidth and a high transfer rate can be used without a significant increase of the cost or a bad influence on signal recording. A rotary transformer is interposed between a transmission side circuit and a reception side circuit. A passive element circuit including an inductance element is connected to an input stage, that is, the stator side, of the rotary transformer in parallel to the rotary transformer. The passive element circuit has an inductance value set equal to or lower than an equivalent inductance value when the circuit of the rotary transformer side is viewed from the transmission side circuit to achieve impedance matching.

2 Claims, 9 Drawing Sheets

SIGNAL TRANSMISSION APPARATUS AND SIGNAL RECORDING APPARATUS IN WHICH A ROTARY TRANSFORMER IS USED

RELATED APPLICATION DATA

The present application claims priority to Japanese Application(s) No.(s). P2001-236237 filed Aug. 3, 2001, which application(s) is/are incorporated herein by reference to the extent permitted by law.

BACKGROUND OF THE INVENTION

This invention relates to a technique for allowing a wide band and a high transfer rate to be used and improving a rising characteristic of recording current to reduce the error rate in a signal transmission apparatus and a signal recording apparatus in which a rotary transformer is used.

An apparatus is known that uses a rotary transformer as signal transmission means for transmitting a signal to a rotary system. For example, in a magnetic recording and/or reproduction apparatus in which a rotary head is used, a rotary transformer is used in a circuit which transmits a signal from a drive circuit, which controls recording current, to the rotor side of the recording head.

It is already known that the frequency characteristic of the circuit of the type mentioned depends upon such various factors as the capacitance of active elements such as transistors of an IC (integrated circuit), wiring lines and so forth which form the drive circuit, the inductance, coupling coefficient and floating capacitance relating to the rotary transformer, and the inductance and the capacitance of the head.

Incidentally, if it is attempted to increase the bandwidth and the transfer rate in such a conventional circuit as described, then, for example, such countermeasures as listed below are taken:

(A) To reduce the capacitance;
(B) To raise the coupling coefficient of the transformer; and
(C) To reduce the inductance of the head and/or the rotary transformer.

However, the countermeasure (A) is impractical because the capacitance relies almost upon the devices used and therefore there remains little room for improvement.

Meanwhile, the countermeasure (B) gives rise to a problem of, for example, a drawback that raising of the coupling coefficient increases the cost upon mass production.

Further, the countermeasure (C) has a fixed limit because the reduction of the inductance gives rise to problems of increase of recording current, drop of the recording efficiency and so forth.

Accordingly, even if trial and error is repeated combining the countermeasures mentioned above suitably, it is difficult to achieve a sufficient transmission characteristic or recording characteristic.

SUMMARY OF THE INVENTION

It is an object of the present invention to provide a signal transmission apparatus and a signal recording apparatus using a rotary transformer, which is capable of using a wide bandwidth and a high transfer rate, without a significant increase of the cost or a bad influence on signal recording.

In order to attain the object described above, according to an aspect of the present invention, there is provided a signal transmission apparatus in which a rotary transformer is used, including a transmission side circuit including a drive circuit and a reception side circuit including a load, the rotary transformer being interposed between the transmission side circuit and the reception side circuit, and a passive element circuit including an inductance element and connected to an input stage of the rotary transformer in parallel to the rotary transformer, the passive element circuit having an inductance value set equal to or lower than an equivalent inductance value when the circuit of the rotary transformer side is viewed from the transmission side circuit.

With the signal transmission apparatus, only by providing a passive element circuit including an inductance element at the input stage of the rotary transformer, the bandwidth and the transmission efficiency can be improved without involving a significant increase of the cost.

According to another aspect of the present invention, there is provided a signal recording apparatus in which a rotary transformer is used, including a transmission side circuit and a reception side circuit between which the rotary transformer is interposed, the transmission side circuit being provided on the stator side of the rotary transformer while the reception side circuit is provided on the rotor side of the rotary transformer, the transmission side circuit including a recording circuit while the reception side circuit includes a recording head or a recording head and a reproduction amplifier such that an output signal of the recording circuit is transmitted to the recording head of the reception side circuit through the rotary transformer, and a passive element circuit including an inductance element and connected to an input stage of the rotary transformer in parallel to the rotary transformer, the passive element circuit having an inductance value set equal to or lower than an equivalent inductance value when the circuit of the rotary transformer side is viewed from the transmission side circuit.

With the signal recording apparatus, the recording bandwidth is expanded when compared with that of a conventional signal recording apparatus. Consequently, improvement in error rate, that is, reduction of the error rate, by an effect of improvement of the recording signal waveform can be achieved, and therefore, higher density recording can be anticipated.

BRIEF DESCRIPTION OF THE DRAWINGS

These and other objects of the invention will be seen by reference to the description, taken in connection with the accompanying drawing, in which.

DETAILED DESCRIPTION OF THE PREFERRED EMBODIMENTS

Figure 1:
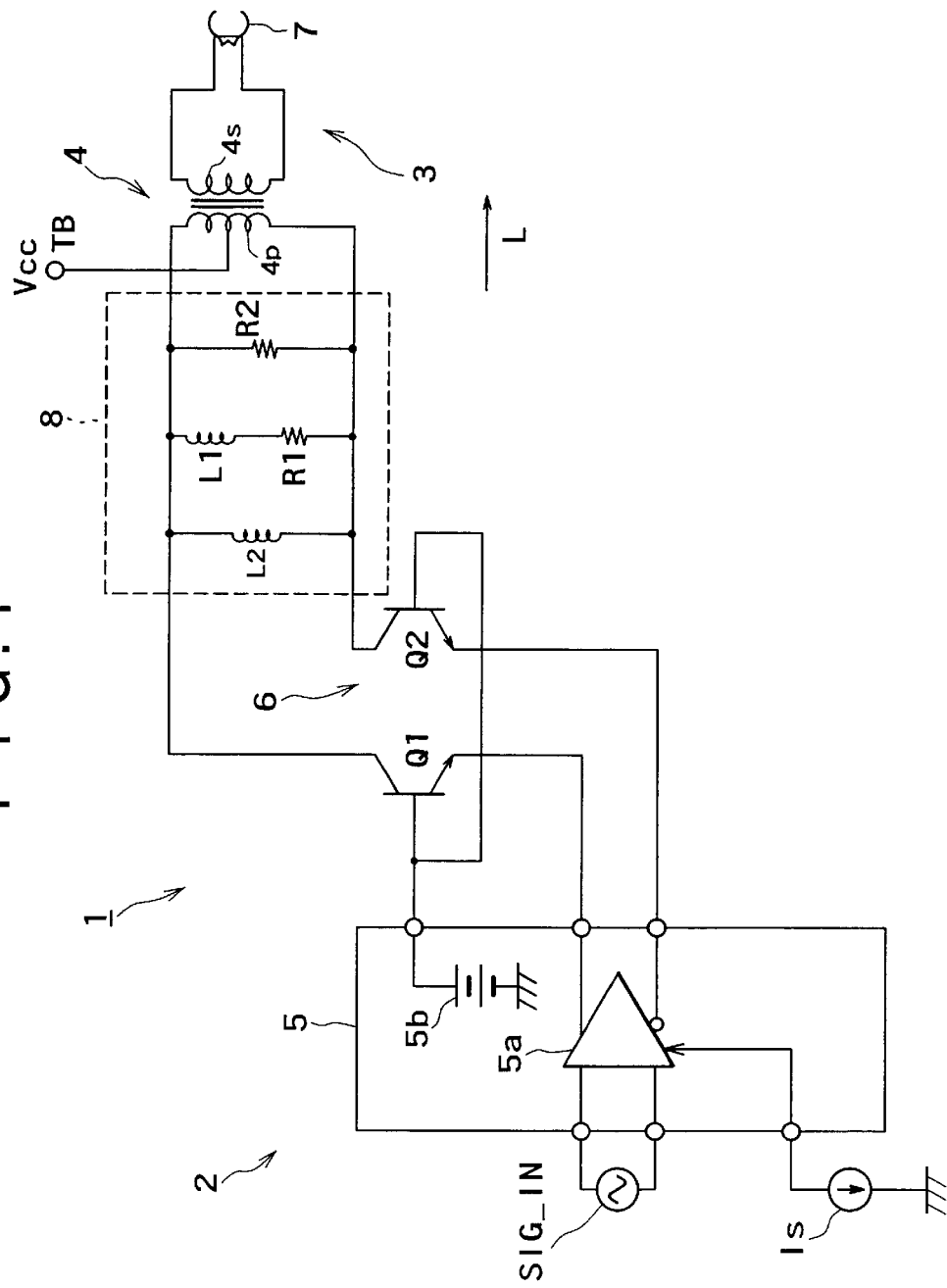
FIG. 1 is a circuit diagram showing a configuration of a signal transmission apparatus to which the present invention is applied.

Referring first to FIG. 1, there is shown a configuration of a signal transmission apparatus to which the present invention is applied. The signal transmission apparatus 1 includes a transmission side circuit 2 and a reception side circuit 3 connected (that is, electro-magnetically coupled) to each other by a rotary transformer 4.

It is to be noted that a rotary transformer is used typically, for example, in a magnetic recording and/or reproduction apparatus using a rotary head. Thus, the signal transmission apparatus 1 shown in FIG. 1 forms as a circuit of a signal recording system of a magnetic recording and/or reproduction apparatus. Further, in the signal transmission apparatus shown in FIG. 1, a rotary transformer with a center tap is used as the rotary transformer 4.

The transmission side circuit 2 includes a drive circuit 5 for providing recording current. In the signal transmission apparatus 1 shown, a current driving IC is used as the drive circuit 5. The drive circuit 5 of the IC includes a driving amplifier 5a to input a recording signal SIG_IN (indicated by a symbol of an ac source in FIG. 1) from a signal processing circuit not shown. The driving amplifier 5a has two output terminals connected to the emitters of NPN transistors Q1 and Q2 form a differential pair 6 outside the IC. A predetermined voltage from a voltage production section 5b (indicated by a symbol of a constant voltage source in FIG. 1) in the IC is supplied to the bases of the transistors Q1 and Q2. The signals obtained at the output terminals of the driving amplifier 5a have phases opposite to each other (a round mark (○) in FIG. 1 represents one of the output terminals), and consequently, the transistors Q1 and Q2 are controlled between on and off reciprocally to each other such that, when one of the transistors Q1 and Q2 exhibits an on state, the other exhibits an off state.

A constant current source "Is" formed using a transistor or the like is externally connected to the current driving IC for controlling the recording current. The current of the driving amplifier 5a is controlled through adjustment and setting of the current value of the constant current source Is.

The collector of the transistor Q1 is connected to one end of a winding 4p of the primary side (with reference to a transmission direction of a recording signal) of the rotary transformer 4, and the other end of the winding 4p is connected to the collector of the transistor Q2. A predetermined voltage "Vcc" from a power supply circuit not shown is supplied to the center tap of the rotary transformer 4 through a power supply terminal TB. Consequently, if the transistor Q1 is placed into an on state while the transistor Q2 is placed into an off state, then current flows from the center tap of the winding 4p through the winding 4p (an upper half portion in FIG. 1) to the transistor Q1. On the other hand, if the transistor Q2 is placed into an on state while the transistor Q1 is placed into an off state, then current flows from the center tap through the winding 4p (a lower half portion in FIG. 1) to the transistor Q2.

A resistor R2 is provided at the input stage (stator side) of the rotary transformer 4 and serves as a damping resistor. One end of the resistor R2 is connected to one end of the winding 4p while the other end of the resistor R2 is connected to the other end of the winding 4p.

The reception side circuit 3 provided on the rotor side of the rotary transformer 4 includes a recording head as a load. The reception side circuit 3 may have a circuit configuration which that includes a recording head, another circuit configuration that includes a recording head and a recording amplifier, a further circuit configuration that includes a recording head, a recording amplifier and a drive circuit, or some other circuit configuration. However, in this embodiment, the reception side circuit 3 shows the simplest configuration including only a recording head 7. One end of the recording head 7 is connected to one end of a secondary side winding 4s of the rotary transformer 4, and the other end of the recording head 7 is connected to the other end of the secondary side winding 4s. Further, similar effects are achieved also where a reproduction signal is transmitted to the stator side using a reproduction amplifier of a magneto-resistance (MR) element or a gigantic magneto-resistance (GMR) on the rotor side as a drive circuit.

A passive element circuit 8 including an inductance element is provided at the input stage of the rotary transformer 4 of the signal transmission apparatus 1 having the configuration described above. In particular, the passive element circuit 8 including an inductance element (inductor) is connected at the input stage of rotary transformer 4 in a parallel connection relationship to the winding 4p of the rotary transformer 4. The passive element circuit 8 has an inductance value substantially equal to or lower than an equivalent inductance (denoted by "L" in FIG. 1) when the circuit following the rotary transformer is viewed from the transmission side circuit 2, that is, from the stator side. It is to be noted that the rotary transformer 4 can be approximated to a T equivalent circuit, and the recording head 7 can be replaced substantially with an inductor, a dc resistor and a winding capacitor. Therefore, a circuit simulation can be performed taking a floating capacitance and so forth into consideration.

The configuration of the passive element circuit 8 may be a configuration wherein a combination of an inductance element and a resistance element is used as a basic element, another configuration wherein only an inductance element is connected in parallel to the rotary transformer, or a further configuration wherein the two configurations described above are combined with each other such as, for example, those described below.

(I) A configuration wherein a circuit including an inductance element L1 and a resistor R1 connected in series is used;

(II) Another configuration wherein an inductance element L2 and a resistor R2 are used;

(III) A further configuration wherein a circuit including an inductance element L1 and a resistor R1 connected in series and another resistor R2 connected in parallel to the series circuit are used; and (IV) A still further configuration wherein a circuit including an inductance element L1 and a resistor R1 connected in series and another inductance element L2 or an inductance element L2 and another resistor R2 connected in parallel to the series circuit are used.

It is to be noted that FIG. 1 shows all of the configurations (I) to (IV) described above in a collected form and therefore shows the configuration (IV) which is a combination of the configurations (I) and (II).

First, in the configuration (I), the series circuit of the inductance element L1 and the resistor R1 is provided at the input stage of the rotary transformer 4. Thus, the configuration (I) corresponds to the configuration of the signal transmission apparatus 1 of FIG. 1 that lacks the inductance element L2 and the resistor R2. In this instance, the inductance value of the inductance element L1 is set substantially equal to the value of the equivalent inductance L including the recording head 7 as a load as viewed from the stator side. Since the bandwidth is widened to the higher frequency side due to an effect of improvement in impedance matching, also higher frequency components than those in the conventional circuit can be transmitted.

It is to be noted that, although the signal transmission apparatus 1 in FIG. 1 includes the single series circuit of the inductance element L1 and the resistor R1, it can be formed in various modified forms such as, for example, a form wherein a plurality of such series circuits are connected in parallel.

In the configuration (II), the passive element circuit 8 includes only the inductance element L2 and the resistor R2 in FIG. 1. With the configuration (II), a wider band than that of the configuration (I) can be used. However, since the transmission efficiency is deteriorated for the inductance of the inductance element L2, it is necessary to take the allowance for loss of the equivalent inductance L into consideration. For example, even if the inductance value of the inductance element L2 is set to three times the equivalent inductance L, the effect described above still remains.

In the configuration (III), the inductance element L2 is connected in parallel to the series circuit of the inductance element L1 and the resistor R1. Accordingly, the configuration (III) is effective where it is desired to adjust the peak of the frequency characteristic in the configuration (I).

The configuration (IV) has a configuration wherein, for example, the inductance element L1 and the resistor R1 of the configuration (I) and the inductance element L2 and the resistor R2 of the configuration (II) are connected in parallel as shown in FIG. 1. Accordingly, the configuration (IV) exhibits the effects exhibited by both of the configurations (I) and (II).

It is to be noted that the configurations described above are mere possible examples of the configuration of the signal transmission apparatus 1, and in order to make the frequency characteristic appropriate, naturally such a suitable modification that, for example, a suitable element such as a series circuit of an inductor and a resistor or a resistor is connected additionally to the passive element circuit 8 may be applied to the configurations.

FIGS. 2 to 5 show several examples of magnitude and phase characteristics. In FIGS. 2 to 5, the axis of abscissa indicates the frequency (unit: MHz) and the axis of ordinate indicates the magnitude level (dB) and the phase (°)

Figure 2:
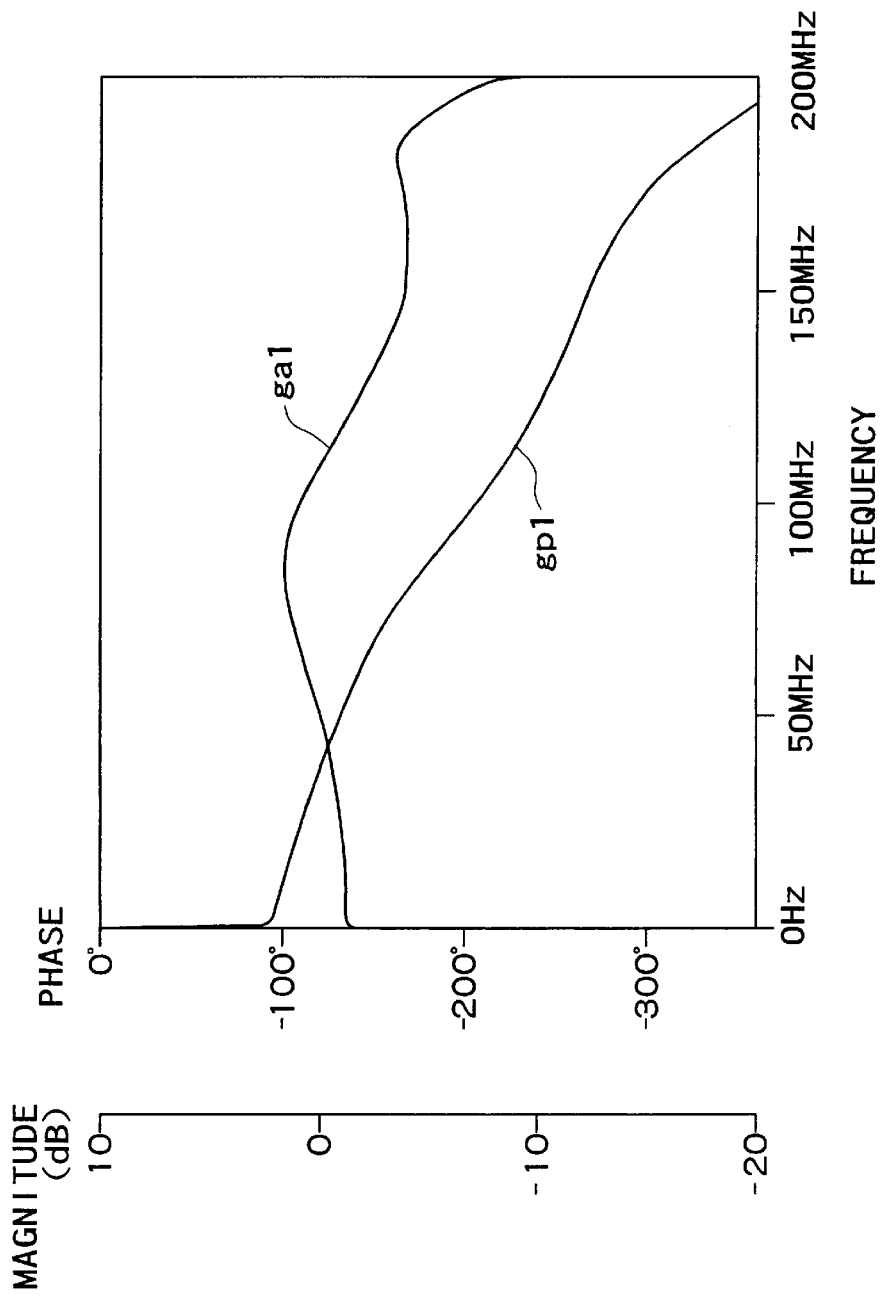
FIG. 2 is a diagram illustrating an example of magnitude and phase characteristics of the signal transmission apparatus of FIG. 1 where a circuit including an inductor and a resistor connected in series is provided at an input stage of a rotary transformer.

FIG. 2 shows an example of the characteristics regarding the configuration (I) described above. In FIG. 2, a curve ga1 indicates a magnitude characteristic and another curve gp1 indicates a phase characteristic. It is to be noted that the inductance of the inductance element L1 is set to a value lower than the equivalent inductance L relating to the rotary transformer 4.

Figure 3:
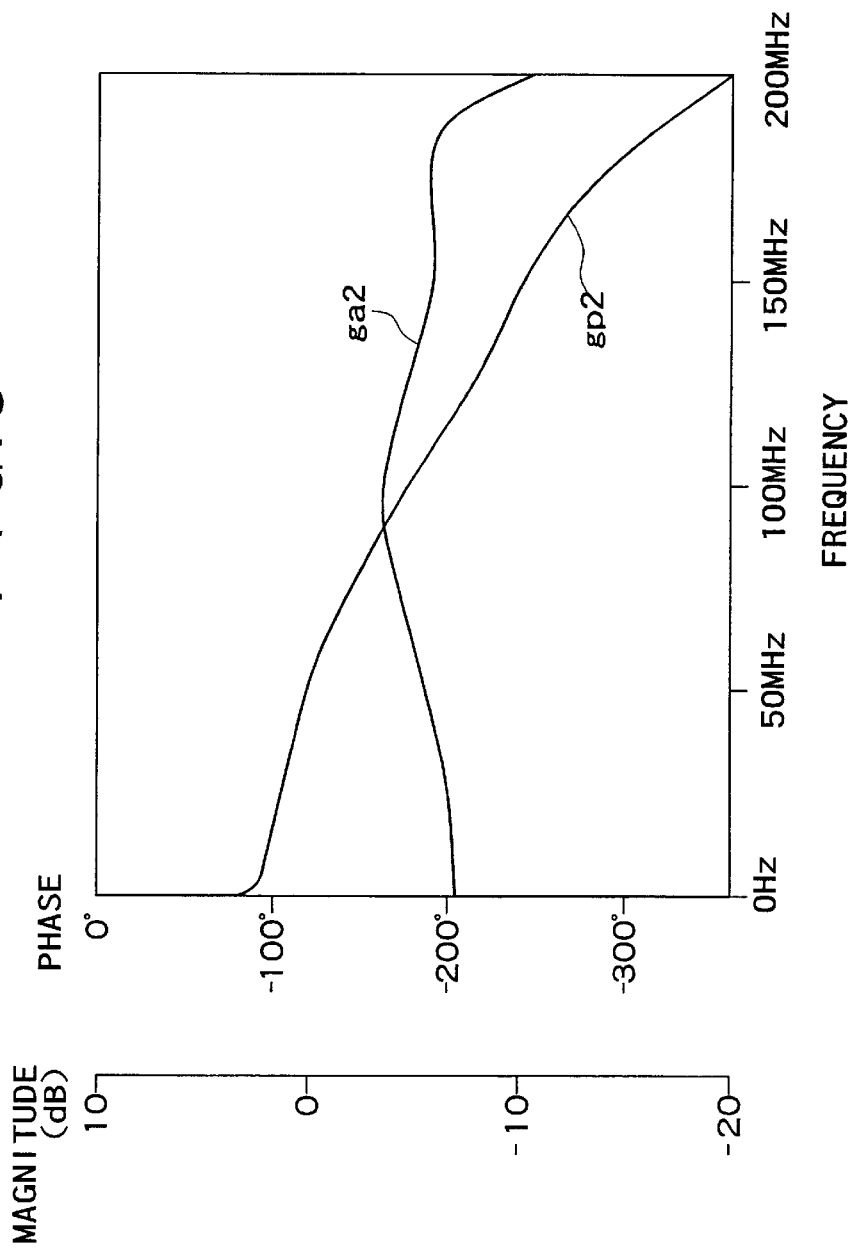
FIG. 3 is a diagram illustrating an example of magnitude and phase characteristics of the signal transmission apparatus of FIG. 1 where a circuit including an inductor and a resistor connected in parallel is provided at the input stage of the rotary transformer.

FIG. 3 shows an example of the characteristics regarding the configuration (II) described above. In FIG. 3, a curve ga2 indicates a magnitude characteristic and another curve gp2 indicates a phase characteristic. It is to be noted that the inductance of the inductance element L2 is set to a value substantially equal to the equivalent inductance L relating to the rotary transformer 4.

Figure 4:
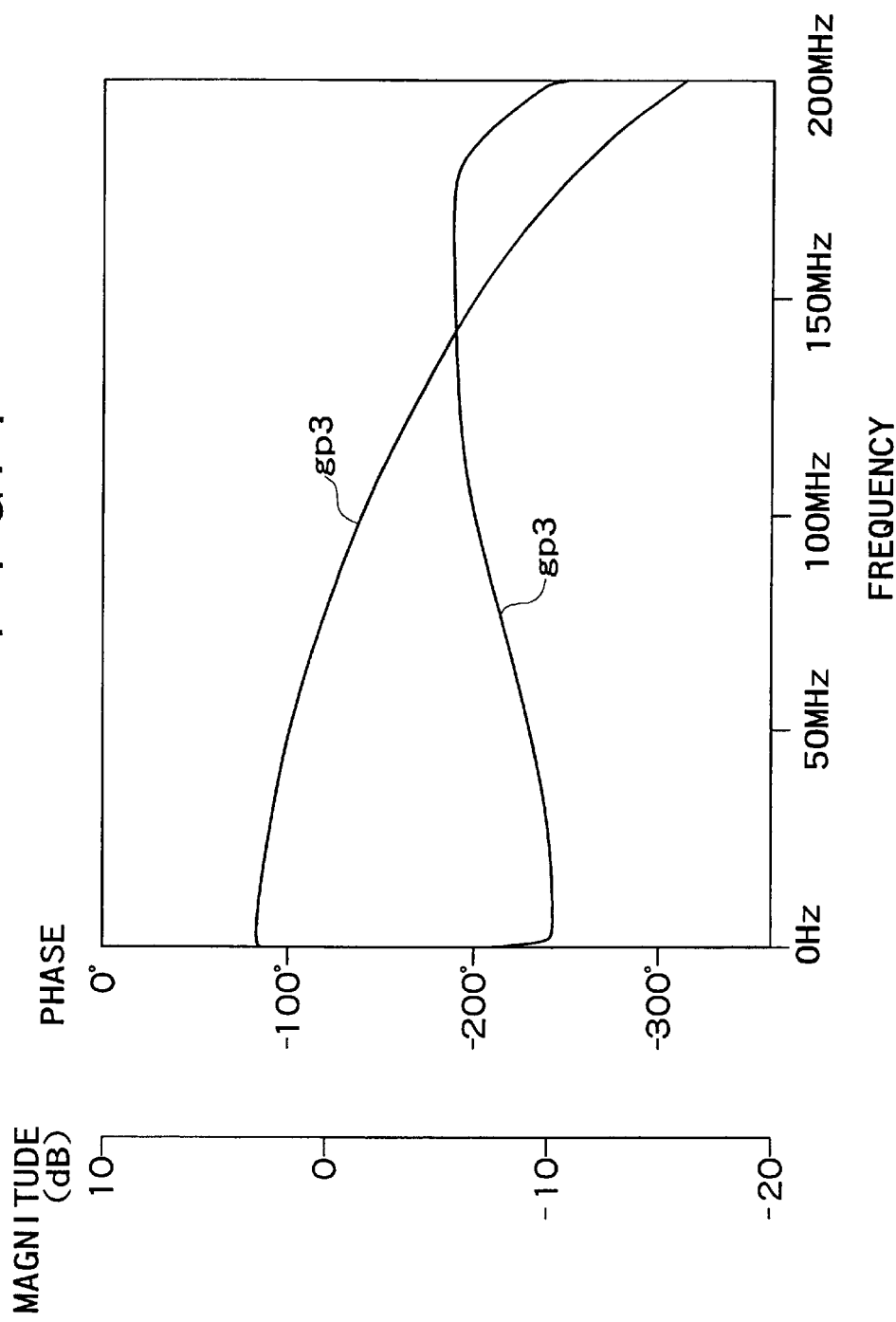
FIG. 4 is a diagram illustrating another example of magnitude and phase characteristics of the signal transmission apparatus of FIG. 1 where a circuit including an inductor and a resistor connected in parallel is provided at the input stage of the rotary transformer, but the inductor has a lower inductance value than that in the case of FIG. 3.

FIG. 4 shows an example of the characteristics regarding the configuration (II) described above. In FIG. 3, a curve ga3 indicates a magnitude characteristic and another curve gp3 indicates a phase characteristic. It is to be noted that the inductance of the inductance element L2 is set to a value lower than the equivalent inductance L relating to the rotary transformer 4.

Figure 5:
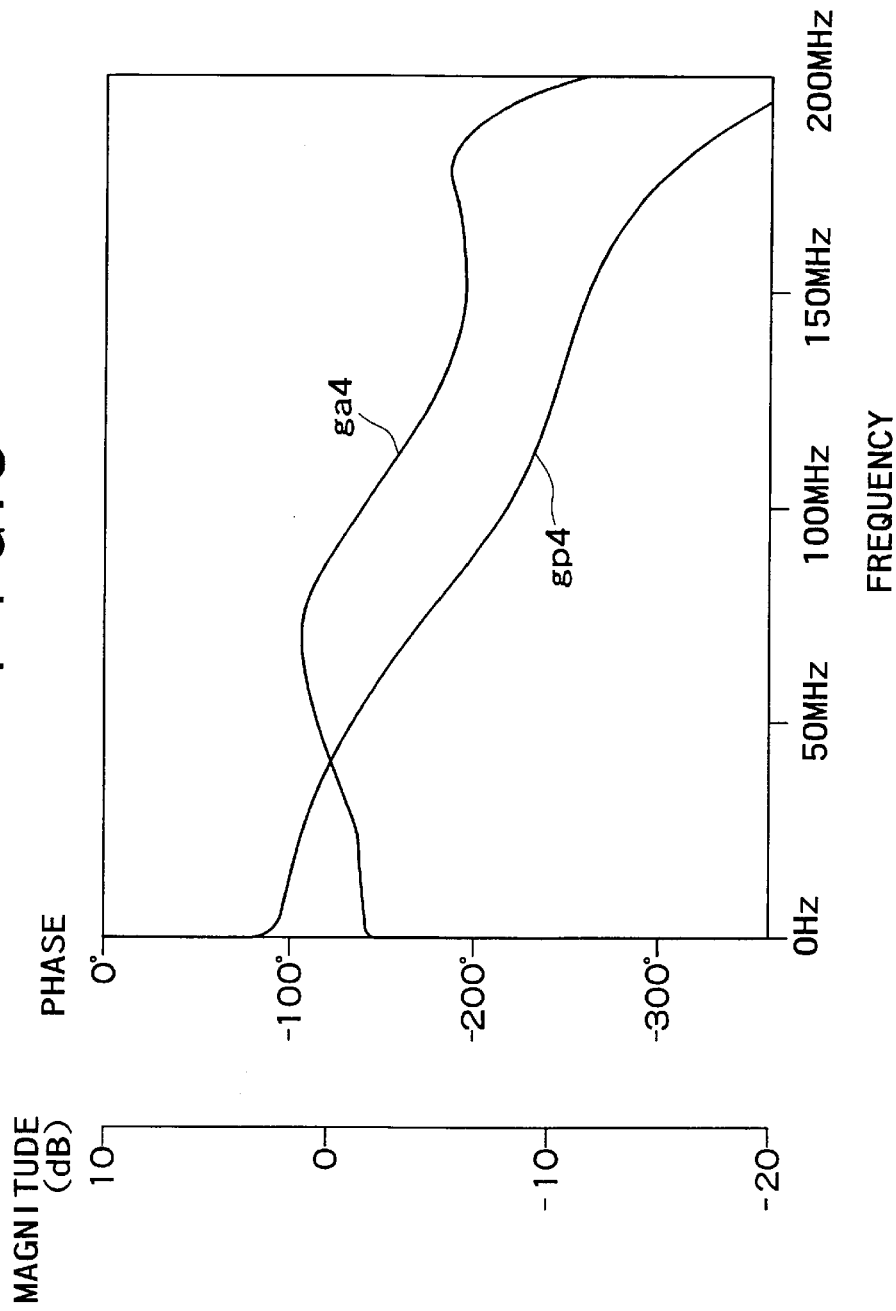
FIG. 5 is a diagram illustrating, as a comparative example, a further example of magnitude and phase characteristics of the signal transmission apparatus of FIG. 1 where a circuit including an inductor and a resistor connected in parallel is provided at the input stage of the rotary transformer, but the inductor has a higher inductance value than that in the case of FIG. 3.

FIG. 5 shows an example of the characteristics regarding the configuration (II) described above. In FIG. 5, a curve ga4 indicates a magnitude characteristic and another curve gp4 indicates a phase characteristic. It is to be noted that the inductance of the inductance element L2 is set to a value higher by ten times than the equivalent inductance L relating to the rotary transformer 4. Consequently, the characteristics are almost similar to those of the conventional circuit. Thus, the characteristics are presented as a comparative example.

From comparison among the characteristics of FIGS. 3 to 5, an influence of the relationship in magnitude between the inductance of the inductance element L2 and the equivalent inductance L described hereinabove can be seen apparently. Where the inductance of the inductance element L2 is excessively high with respect to the equivalent inductance L, the effect of improvement of the characteristics disappears.

Figure 6:
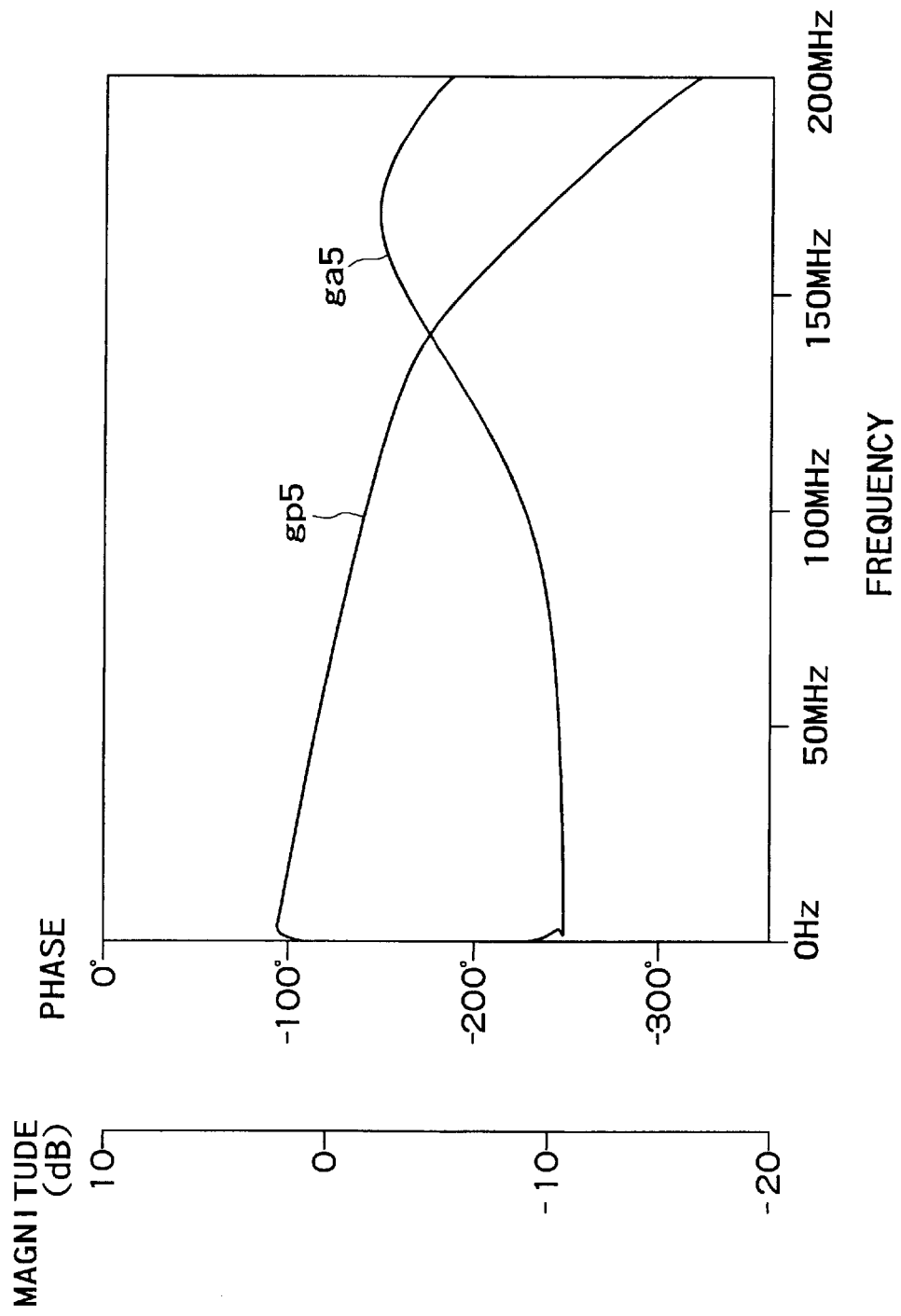
FIG. 6 is a diagram illustrating an example of magnitude and phase characteristics of the signal transmission apparatus of FIG. 1 where a circuit including an inductor and a resistor connected in series and another inductor connected in parallel to the series circuit is provided at the input stage of the rotary transformer.

FIG. 6 shows an example of the characteristics regarding the configuration (IV) described above. In FIG. 6, a curve ga5 indicates a magnitude characteristic and another curve gp5 indicates a phase characteristic. It can be seen that the frequency characteristics are improved significantly with the configuration (IV). It is to be noted that, in this instance, a circuit wherein the inductance element L2 is connected in parallel to the series circuit of the inductance element L1 and the resistor R1 is used.

Figure 7:
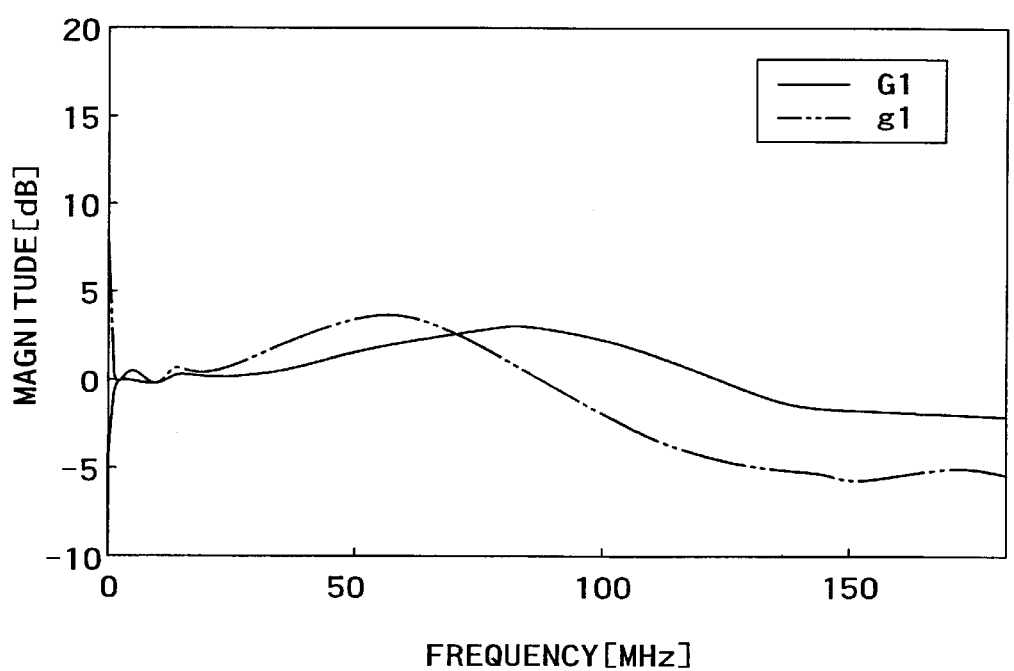
FIG. 7 is a diagram illustrating a circuit characteristic of the signal transmission apparatus of FIG. 1 where it has a certain form in comparison with a characteristic of a conventional circuit.

FIG. 7 illustrates an example of an output characteristic of the configuration (IV) in comparison with that of the conventional signal transmission apparatus. In FIG. 7, the axis of abscissa indicates the frequency (unit: MHz) and the axis of ordinate indicates the magnitude level (unit: dB).

In FIG. 7, a curve G1 indicated by a solid line indicates a characteristic of the circuit according to the present invention, and a curve g1 indicated by an alternate long and two short dashes line indicates a characteristic of the conventional circuit (the configuration of FIG. 1 in which only the resistor R2 is provided). From comparison between the curves G1 and g1, it can be seen that the characteristic indicated by the curve G1 extends to the higher frequency side.

Figure 8:
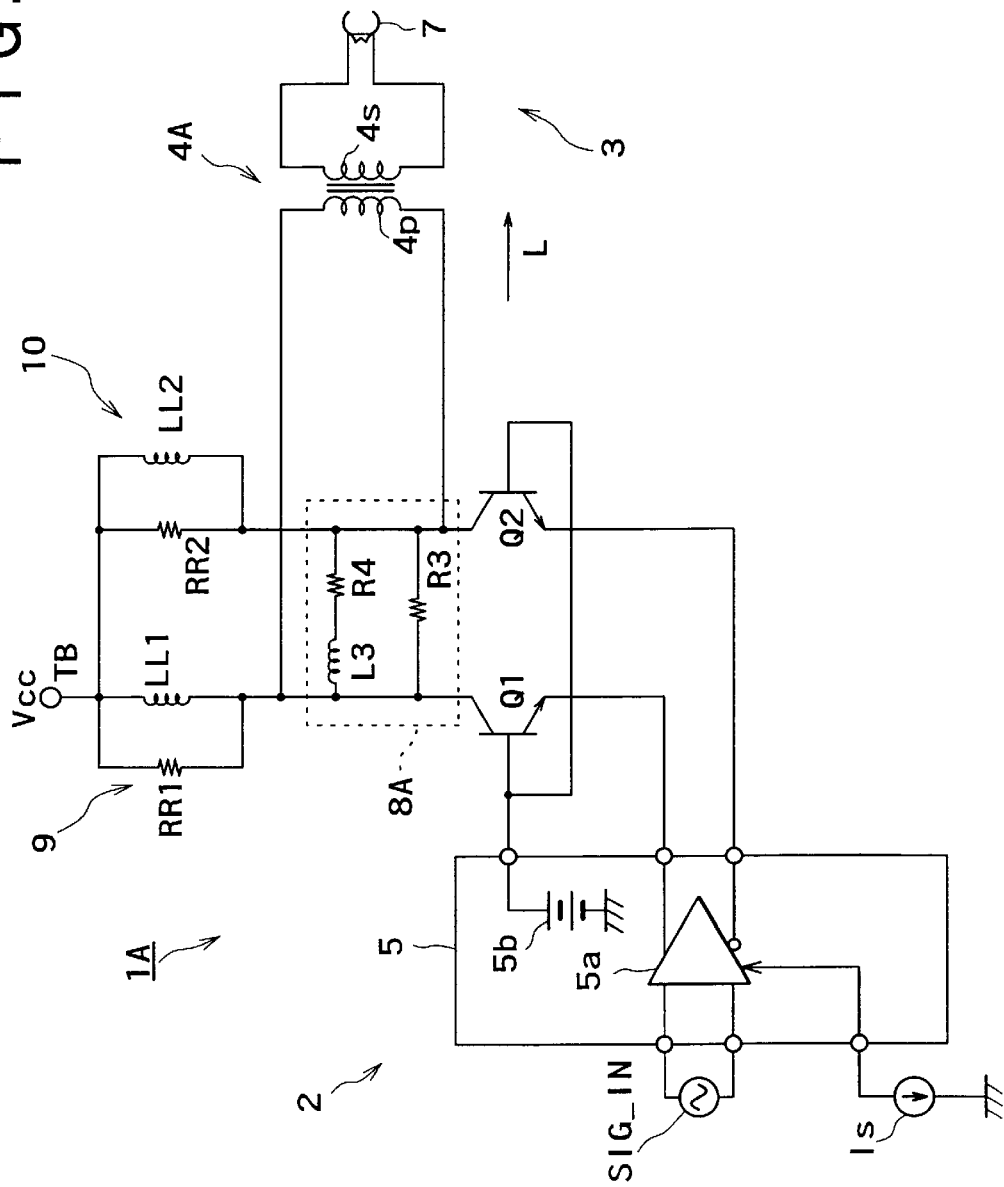
FIG. 8 is a circuit diagram showing a configuration of another signal transmission apparatus to which the present invention is applied.

FIG. 8 shows a configuration of another signal transmission apparatus to which the present invention is applied. Referring to FIG. 8, the signal transmission apparatus 1A is similar to the signal transmission apparatus 1 in that a transmission side circuit 2 and a reception side circuit 3 are connected to each other using a rotary transformer, but is different in that a rotary transformer having no center tap is used as the rotary transformer. Therefore, the difference of the signal transmission apparatus 1A from the signal transmission apparatus 1 is described in detail while description of common elements of the signal transmission apparatus 1A to which like reference characters to those of the signal transmission apparatus 1 are applied is omitted to avoid redundancy.

In the signal transmission apparatus 1A, a circuit section 9 including an inductor LL1 and a resistor RR1 connected in parallel and another circuit section 10 including an inductor LL2 and a resistor RR2 connected in parallel are connected to a power supply terminal TB.

A winding 4p of the primary side of the rotary transformer 4A is connected at one end thereof to the power supply terminal TB through the circuit section 9 and the collector of a transistor Q1. The other end of the winding 4p is connected to the power supply terminal TB through the circuit section 10 and the collector of another transistor Q2.

The configurations of the transistors Q1 and Q2 and the drive circuit 5 are quite similar to those of the signal transmission apparatus 1. Therefore, when the transistor Q2 is placed into an on state while the transistor Q1 is placed into an off state, current flows from the circuit section 9 through the winding 4p of the rotary transformer 4A to the transistor Q2. However, when the transistor Q1 is placed into an on state while the transistor Q2 is placed into an off state, current flows from the circuit section 10 through the winding 4p of the rotary transformer 4A to the transistor Q1. Accordingly, the direction of current flowing through the winding 4p is reversed between the two cases.

For example, the following configurations may be applied as a configuration of a passive element circuit 8A provided at the input stage of the rotary transformer 4A.

(V) A configuration wherein a circuit including an inductance element L3 and a resistor R4 connected in series is used;

(VI) Another configuration wherein a circuit including an inductance element L3 and a resistor R4 connected in series and another resistor R3 connected in parallel to the series circuit are used;

(VII) A further configuration wherein only a resistor R3 is used and the sum of the inductance of the inductor LL1 and the inductance of the inductor LL2 is set lower than that of the conventional signal transmission apparatus;

(VIII) A still further configuration wherein the sum of the inductance of the inductor LL1 and the inductance of the inductor LL2 in the configuration (V) is set lower than that of the conventional signal transmission apparatus; and (IX) A yet further configuration wherein the sum of the inductance of the inductor LL1 and the inductance of the inductor LL2 in the configuration (VI) is set lower than that of the conventional signal transmission apparatus.

It is to be noted that FIG. 8 shows the configurations (V) to (IX) described above collectively and therefore shows a configuration same as that of the configuration (VI) or (IX).

First, in the configuration (V), a circuit including an inductance element L3 and a resistor R4 connected in series is provided at the input stage (stator side) of the rotary transformer 4A. This corresponds to the configuration of FIG. 8, which lacks the resistor R3. In this instance, if the inductance of the inductance element L3 is substantially equal to the value of the equivalent inductance L (including the recording head 7 as a load) as viewed from the stator side, then the bandwidth is greatest. However, the inductance of the inductance element L3 is sometimes set to a lower value for the convenience of design of the frequency characteristic. It is to be noted that, although the signal transmission apparatus 1A in FIG. 8 includes the single series circuit of the inductance element L3 and the resistor R4, if necessary, it can be formed in various modified forms such as, for example, a form wherein a plurality of such series circuits are connected in parallel.

In the configuration (VI), a resistor R3 is connected in parallel to a series circuit of an inductance element L3 and a resistor R4. Accordingly, the configuration (VI) is effective where it is desired to adjust the peak of the frequency characteristic in the configuration (V).

In the configuration (VII), only a resistor R3 is provided in addition to the inductors LL1 and LL2 and the resistors RR1 and RR2. Accordingly, the bandwidth can be increased when compared with the configuration (V). However, since the transmission efficiency to the head is deteriorated, the inductance values of the inductors LL1 and LL2 must be determined taking the allowance value for the loss of the equivalent inductance L into consideration. Therefore, preferably the sum value of the inductance values of the inductors LL1 and LL2 is set lower than that of the conventional signal transmission apparatus.

The configuration (VIII) basically has the same configuration as that of the configuration (V). However, since the sum value of the inductance values of the inductors LL1 and LL2 is similar to that of the configuration (VII), the configuration (VIII) has effects of the other configurations.

The configuration (IX) basically has the same configuration as that of the configuration (VI). However, since the sum value of the inductance values of the inductors LL1 and LL2 is similar to that of the configuration (VII), the configuration (IX) has effects of the other configurations.

Anyway, since the bandwidth is expanded to the high frequency side as a result of improvement in impedance matching between the rotary transformer and the recording side circuit (drive circuit), also higher frequency components than those in the conventional signal transmission apparatus can be transmitted.

It is to be noted that, although also configurations wherein an inductance element is disposed in parallel to the resistor R3 in the configuration (V) or (VI) are possible, this is equivalent to alteration of the inductance relating to the inductors LL1 and LL2.

Figure 9:
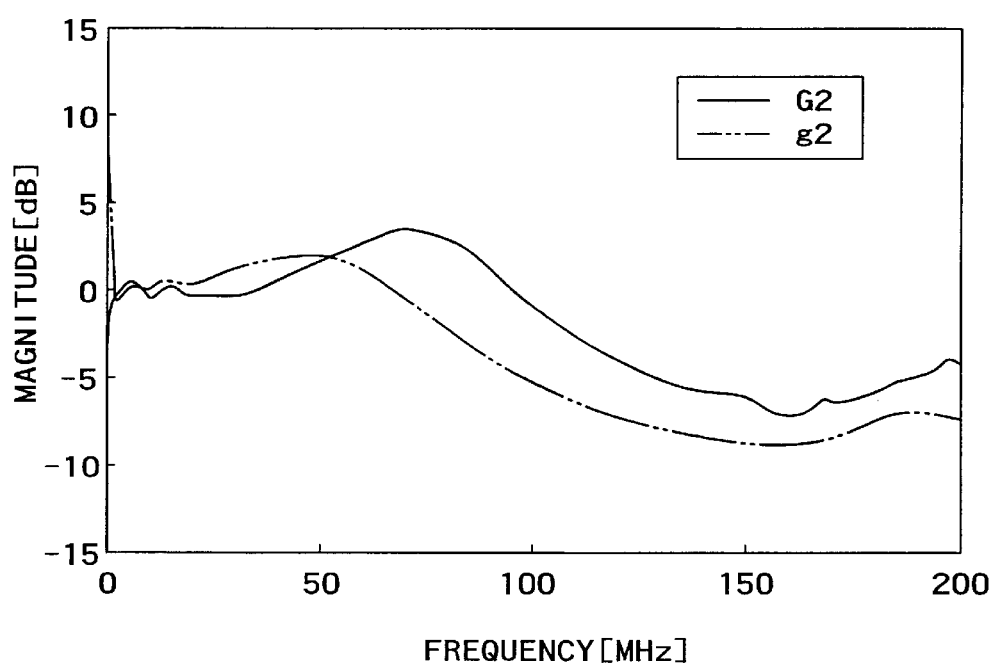
FIG. 9 is a diagram illustrating a circuit characteristic of the signal transmission apparatus of FIG. 8 where it has another form in comparison with another characteristic of another conventional circuit.

FIG. 9 illustrates an example of the output characteristic relating to the configuration (VI) in comparison with that of the conventional signal transmission apparatus. The axis of abscissa indicates the frequency (unit: MHz) and the axis of ordinate indicates the magnitude level (unit: dB).

In FIG. 9, a curve G2 indicated by a solid line indicates a characteristic of the circuit according to the present invention, and a curve g2 indicated by an alternate long and two short dashes line indicates a characteristic of the conventional circuit (the configuration of FIG. 8 in which only the resistor R3 is provided). From comparison between the curves G2 and g2, it can be seen that the characteristic indicated by the curve G2 extends to the higher frequency side.

While preferred embodiments of the present invention have been described using specific terms, such description is for illustrative purposes only, and it is to be understood that changes and variations may be made without departing from the spirit or scope of the following claims.

What is claimed is:

1. A signal transmission apparatus in which a rotary transformer is used, comprising:

a transmission side circuit including a drive circuit and a reception side circuit including a load, said rotary transformer being interposed between said transmission side circuit and said reception side circuit; and a passive element circuit including an inductance element and a resistor connected in series and a second inductance element connected in parallel with the inductance element and the resistor, the passive element circuit connected directly to an input stage of said rotary transformer in parallel to said rotary transformer;

said passive element circuit having an inductance value set equal to or lower than an equivalent inductance value when the circuit of said rotary transformer side is viewed from said transmission side circuit.

2. A signal recording apparatus in which a rotary transformer is used, comprising:

a transmission side circuit and a reception side circuit between which said rotary transformer is interposed;

said transmission side circuit being provided on the stator side of said rotary transformer while said reception side circuit is provided on the rotor side of said rotary transformer;

said transmission side circuit including a recording circuit while said reception side circuit includes a recording head or a recording head and a reproduction amplifier such that an output signal of said recording circuit is transmitted to said recording head of said reception side circuit through said rotary transformer; and a passive element circuit including an inductance element and a resistor connected in series and a second inductance element connected in parallel with the inductance element and the resistor, the passive element circuit connected directly to an input stage of said rotary transformer in parallel to said rotary transformer;

said passive element circuit having an inductance value set equal to or lower than an equivalent inductance value when the circuit of said rotary transformer side is viewed from said transmission side circuit.

* * * * *